Patented Sept. 4, 1934

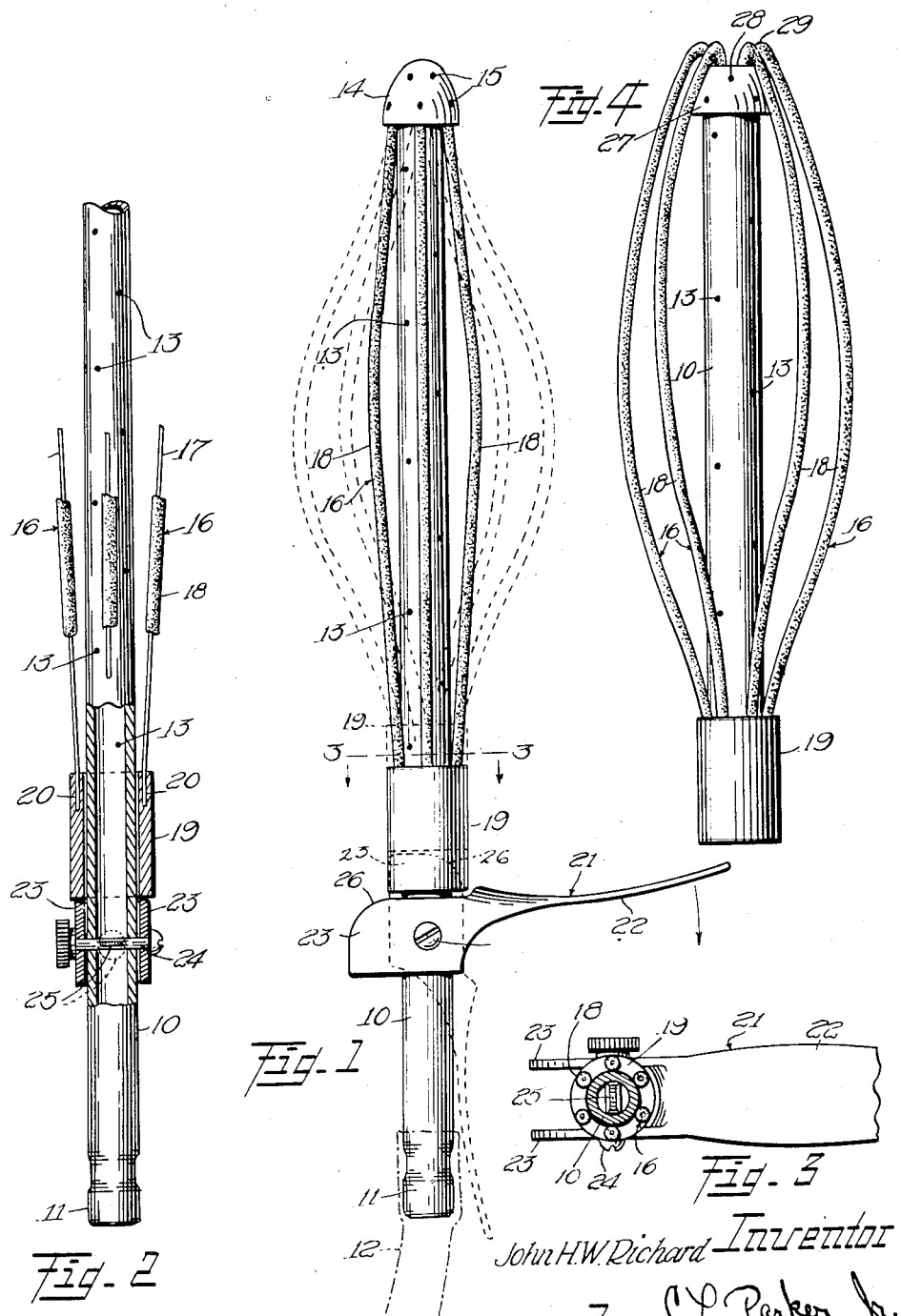

1,972,428

UNITED STATES PATENT OFFICE 1,972,428

SYRINGE

John H. W. Richard, Miami, Fla.

Application December 6, 1932, Serial No. 645,981

4 Claims. (Cl. 128—243)

This invention relates to syringes and more particularly to a sanitary vaginal syringe.

An important object of the invention is to provide a douche wherein a mechanical operation cooperates with the flow of liquid to thoroughly cleanse the membranes of the affected parts.

A further object is to provide a device which is simple in construction and wherein thorough cleansing is provided without inconvenience or injury.

A further object is to provide a device of the character referred to wherein the application of a cleansing or flushing liquid is accompanied by a mechanical wiping action which greatly increases the efficiency of the device and insures a thoroughly sanitary condition of the parts.

A further object is to provide a syringe of the character referred to wherein the wiping action is provided by an expansible mechanical device which is controlled together with the flow of the cleansing fluid by the use of a single operating handle.

Other objects and advantages of the invention will become apparent during the course of the following description.

In the drawing I have shown two embodiments of the invention. In this showing:

Figure 1 is a side elevation, parts being shown in operative position in dotted lines, Figure 2 is a fragmentary side elevation, parts being broken away and parts being shown in section, Figure 3 is a section on line 3—3 of Figure 1, and, Figure 4 is a side elevation of a portion of the modified form of the device.

Referring to Figures 1 to 3 inclusive, the numeral 10 designates the body portion of the device which is in the form of a unitary tubular stem having one end formed as a nipple 11 adapted for connection with a rubber or similar flexible tube 12 leading from the douche bag or other similar source of fluid supply. The stem 10 has a portion provided with perforations 13 spaced longitudinally and circumferentially for the passage of the liquid therethrough.

The free end of the stem 11 is provided with a rounded cap 14 preferably revolubly connected on the stem and provided with perforations 15.
The device is provided with a plurality of normally longitudinally extending circumferentially spaced mechanical cleansing or wiping elements each indicated as a whole by the numeral 16 and comprising a resilient wire body 17 having a covering of soft resilient material 18 such as rubber. One end of each of the wires 17 is connected to the cap 14 and has its other end connected to a sleeve 19 slidable on the stem 10. The connection of the wires 17 with the cap 14 and sleeve 19 may be in any desired form, as shown for example in Figure 2 wherein the extremities of the wires are shown as being tightly received in openings 20 formed in the sleeve 19.

An operating lever is privided for the device and is indicated as a whole by the numeral 21. This lever includes a handle portion 22 and oppositely arranged ear portions 23 formed as a yoke and arranged on opposite sides of the stem 10 as shown in Figures 2 and 3. The ears 23 are pivotally connected to the stem 10 by a pin or bolt 24 extending entirely through the stem 10 and provided therein with a valve 25 similar to an ordinary butterfly valve. The ears 23 normally occupy the position shown in Figure 1 and are provided with cam portions 26 operable against the lower end of the sleeve 19 upon operation of the handle 22, for a purpose to be described. The valve 25 is in closed position when the lever 21 is in normal position.

The form of the invention shown in Figure 4 is very similar to the form previously described and need not be referred to in detail. Instead of the cap 14, rounded over its end, a different type of cap 27 may be employed having perforations 28 for the passage of the liquid therethrough. In this form of the invention the cleansing elements 16 have their wires and coverings turned inwardly as at 29 at the extremity of the device so that the wires are connected to the extremity of the cap 27. This cap also is preferably revolubly connected to the stem 10.

The operation of the device is as follows:

The douche bag is filled with the desired medicinal liquid in accordance with the usual practice, and the device is inserted in the vaginal cavity with the parts in the normal position shown in Figure 1 with the member 16 contracted and with the lever 21 projecting laterally from the device. With the parts in the position indicated, the valve 25 will be in closed position. The device is operated by moving the lever 21 to the dotted line position shown in Figure 1. This action opens the valve 25 and at the same time the cams 26 engage the adjacent end of the sleeve 19 to move it longitudinally and thus expand the member 16 substantially to the dotted line position shown in Figure 1. The opening of the valve obviously permits the liquid to flow through the stem 10 to be discharged through the openings 13 and 15, while the expansible cleansing elements expand the cavity somewhat to facilitate the action of the cleansing liquid.

Moreover, the cap 14, sleeve 19 and members 16 are connected together as a unit to rotate independently of the stem 10, and accordingly the rubber or other soft resilient coverings 18 may be rotated in contact with the parts to act as wipers to assist in the flushing and cleansing action. The coverings 18 are very soft and smooth, and accordingly assist in the cleasing action without any irritation to the sensitive membranes. The lever 21 may be returned to normal position when the operation is completed, thus contracting the members 16 and cutting off the flow of liquid.

The operation of the form of the device shown in Figure 4 is identical with the form previously described and need not be referred to in detail. The parts of the device are mostly identical with the parts in the previously described form of the invention and have been designated by the same reference numerals. The only difference in the two forms of the device is in the particular form of cap employed on the stem and the means for connecting the members 16 thereto. In the modified form of the device the members 16 also are expansible and also are preferably formed of resilient wire bodies having soft rubber or other resilient coverings thereon.

The device is simple in construction and easily and readily operated without injury, discomfort or inconvenience. The provision of mechanical wiping means in combination with the means for supplying a flushing liquid to the parts being treated insures thorough and sanitary cleansing.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A device of the character described comprising a tubular body having perforations in one end portion for the passage of liquid therethrough, expansible wiping means surrounding said body, a valve controlling the flow of liquid through said body, and common means for expanding said wiping means and opening said valve.

2. A device of the character described comprising a tubular body having perforations in one end portion for the passage of liquid therethrough, a plurality of longitudinally extending elastic wiping members circumferentially spaced around said body, a valve controlling the passage of liquid through said body, and common means for opening said valve and effecting relative longitudinal movement between the ends of said wiping members to effect outward movement of the intermediate portions thereof with respect to said body.

3. A device of the character described comprising a tubular body having perforations in one end portion for the passage of liquid therethrough, a plurality of longitudinally extending elastic wiping members circumferentially spaced around said body and fixed at one end with respect thereto, a slidable sleeve surrounding said body and secured to the other ends of said wiping members, a valve controlling the passage of liquid through said body, and common operating means for opening said valve and moving said sleeve longitudinally on said body toward the first named ends of said wiping members to expand the central portions of said wiping members outwardly with respect to said body.

4. A device of the character described comprising a tubular body having perforations in one end portion for the passage of liquid therethrough, means for supplying liquid to the other end of said body, a cap revoluble on the extremity of the first named portion of said body, a sleeve slidable and rotatable on said body intermediate its ends, a plurality of longitudinally extending circumferentially spaced elastic wiping members secured at opposite ends to said cap and said sleeve, a valve arranged in said body between the perforations therein and the second named end of said body, and a lever pivotally connected to said body and provided with a cam portion operative against the end of said sleeve opposite said members for moving said sleeve longitudinally toward said cap to expand the central portions of said members radially outwardly with respect to said body, said lever being connected to said valve to open it when said cam portion effects movement of said sleeve.

JOHN H. W. RICHARD.